US009483591B1

(12) United States Patent
Arbel et al.

(10) Patent No.: US 9,483,591 B1
(45) Date of Patent: Nov. 1, 2016

(54) ASSURING CHIP RELIABILITY WITH AUTOMATIC GENERATION OF DRIVERS AND ASSERTIONS

(71) Applicant: INTERNATIONAL BUSINESS MACHINES CORPORATION, Armonk, NY (US)

(72) Inventors: Eli Arbel, Nesher (IL); Erez Barak, Hod Hasharon (IL); Bodo Hoppe, Stuttgart (DE); Udo Krautz, Esslingen (DE); Shiri Moran, Kiryat Tivon (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/953,094

(22) Filed: Nov. 27, 2015

(51) Int. Cl.
*G06F 9/455* (2006.01)
*G06F 17/50* (2006.01)

(52) U.S. Cl.
CPC ......... *G06F 17/5022* (2013.01); *G06F 17/505* (2013.01)

(58) Field of Classification Search
USPC ........................................................ 716/106
See application file for complete search history.

(56) References Cited

U.S. PATENT DOCUMENTS

| 7,900,181 | B2 | 3/2011 | Hekmatpour et al. | |
| 8,234,102 | B2 | 7/2012 | Lange | |
| 8,589,841 | B2 * | 11/2013 | Arbel et al. | G06F 17/504 714/42 |
| 9,021,409 | B2 | 4/2015 | Vasudevan et al. | |
| 2014/0250414 | A1 | 9/2014 | Lu et al. | |
| 2015/0082263 | A1 | 3/2015 | Vasudevan et al. | |

OTHER PUBLICATIONS

Arbel, et al., "Automated Detection and Verification of Parity-Protected memory Elements," IEEE 2014:978-1-4799-6278; (8 pages).
Chatterjee, et al., "Utilizing Assertion Synthesis to Achieve an Automated Assertion-Based Verification Methodology fo Complex Graphics Chip Designs," Design Automation Conference; Jun. 13-18, 2010; 2 pages.
Frehse, et al., "Complete and Effective Robustness Checking by Means of Interpolation," IEEE 2012: Proceedings of the 12th Conference on Formal Methods in Computer-Aided Design; pp. 82-90 (9 pages).
Hekmatpour, Amir et al., "Block-Based Schema-Driven Assertion Generation for Functional Verification," IEEE 2005, ATS '05; 1081-7735/05; 6 pages.
Krautz, et al., "Evaluating Coverage of Error Detection Logic for Soft Errors Using Formal Methods," University of Kaiserslautern: Sep. 11, 2005; (6 pages).
Leveugle, R et al., "Statistical Fault Injection:Quantified Error and Confidence," EDAA 2009: TIMA Laboratory; 978-3-9810801-5-5; (5 pages).
Liu, Lingyi et al., "Automatic Generation of Assertions from System Level Design using Data Mining," IEEE 2011:978-1-4577-0118-411; pp. 191-200; (10 pages).

(Continued)

*Primary Examiner* — Eric Lee
(74) *Attorney, Agent, or Firm* — Cantor Colburn LLP; David Quinn

(57) ABSTRACT

A computer-implemented method may include retrieving a design netlist with a processor, identifying, via the processor, a logic structure in the design netlist, generating, via the processor, a driver based on the logic structure, applying, via the processor, a simulation and a formal model based on the driver, and testing, via the processor, an output of the simulation and the formal model.

20 Claims, 9 Drawing Sheets

(56) References Cited

OTHER PUBLICATIONS

Macieira, Rafael M., et al., "Device Driver Generation and Checking Approach," Brazilian Symposium on Computing System Engineering: 2011 IEEE, 978-0-7695-4641-4/11; pp. 72-77, (6 pages).
Maniatakos, Michail, et al., "Workload-Driven Selective Hardening of Control State Elements in Modern Microprocessors," IEEE VLSI Test Symposium; 28:2010; pp. 159-164 (6 pages).
Ramachandran, Pradeep, et al., "Statistical Fault Injection," IBM Systems and Technology Group: DSN 2008; (6 pages).
Seshia, et al., "Verification-Guided Soft Error Resilience," Electrical Engineering and Computer Sciences University of California at Berkely: Sep. 26, 2006; (14 pages).
Vasudevan, Shobha et al, "Goldmine: Automatic Assertion Generation Using Data Mining and Static Analysis," EDAA 2010: 978-3-9810801-6-2; 4 pages.

* cited by examiner

```
data_to_neigbour      : out std_ulogic_vector(0 to 4);
data_to_neigbour_p    : out std_ulogic;

data_to_neigbour_p        <= data_to_neigbour_p_q;
data_to_neigbour_q(0 to 4) <= data_to_neigbour_q(0 to 4);
data_to_neigbour_p_in     <= parity_gen_even(data_to_neigbour_in(0 to 4));

-- data_to_neigbour_p_q is the output of a latch whose input is data_to_neigbour_p_in
-- data_to_neigbour_q is the output of a latch whose input is data_to_neigbour_in
```

FIG. 6

```
data        : out std_ulogic_vector (0 to 5);
data_p      : out std_ulogic;

data(0 to 5) <= gate_and(sel_q(0), data_set0) or
                gate_and(sel_q(1), data_set1);
data_p      <= gate_and(sel_q(0), parity_gen_even(data_set0)) or
                gate_and(sel_q(1), parity_gen_even(data_set1));

assert always (data_p = parity_gen_even(data))
```

FIG. 7

```
-- vec_q abd vec_p_q are outputs of latches
pchk_err_in <= valid and is_parity_odd(vec_q(0 to 11) & vec_p_q);
```

```
pchk_err_in <= valid and is_parity_odd(vec_q(0 to 11) & vec_p_q);  -- unchanged -- the latches outputs are renamed to vec_q_orig and vec_p_q_orig,
-- and the following lines are added to the code:

vec_q   <= random_bit when (valid = '0') else vec_q_orig;
vec_p_q <= random_bit when (valid = '0') else vec_p_q_orig;
```

FIG. 9

ASSURING CHIP RELIABILITY WITH AUTOMATIC GENERATION OF DRIVERS AND ASSERTIONS

BACKGROUND

The present disclosure relates to assuring chip reliability, and more specifically, to assuring chip reliability with generation of chip reliability drivers and assertions based on chip structure identification.

With the shrinking sizes of hardware devices, design susceptibility to soft errors became a significant concern in electrical designs. Most modern designs, from application-specific integrated circuits (ASICs) to microprocessors, contain some degree of Error Detection and/or Correction (EDC) capabilities, often implemented as supplementary logic. In some cases, a design may adhere to very strict reliability requirements and may be designed with an extensive amount of EDC in it such that almost all functional latches may be protected against soft (or hard) errors using hardware error checkers. Different methodologies and techniques are used in order to verify that a given design meets its reliability requirements.

One of these methods is code review, which occurs during the logic implementation phase. The goal of the review process is to make sure that latches in the design are protected according to a corresponding specification. For example, if a specification indicates that a command bus is to be protected by parity checking, the design reviewer will have to make sure that is what was actually implemented in the hardware description (for example, the VHSIC Hardware Description Language (VHDL files)). Since the verification process involves going thru many lines of code across various files, the process can be time-consuming, expensive, and error prone.

Some current methods for chip verification may apply simulation techniques designed to find invariance in the design and to assist functional verification of the design. Further techniques may include fault injection techniques to ensure reliability. Current methods may be general and not configured to improve chip reliability. Furthermore, they may not take advantage of predefined reliability protection structures that exist on modern processing chips. For example, some conventional approaches may include generating assertions for general verification of a chip based on certain specifications provided by the user. This approach often focuses on ranking the generated assertions. These methods may consider reliability verification and may not check the general correctness of a design.

Simulation traces, data mining, and formal verification are also commonly used to automatically identify general assertions that may be invariants of the design. Again, these conventional methods may not consider the reliability of the chip based on prior knowledge about reliability structures, may not seek for general invariants, and do not use simulation traces or data mining to generate the assertions.

SUMMARY

According to some embodiments, a computer-implemented method for assuring a reliability of a chip is described. The computer-implemented method may include retrieving a design netlist with a processor, identifying, via the processor, a logic structure in the design netlist, generating, via the processor, a driver based on the logic structure, applying, via the processor, a simulation and a formal model based on the driver, and testing, via the processor, an output of the simulation and the formal model.

According to other embodiments, a system for assuring a reliability of a chip is described. The system may include a processor configured to retrieve a design netlist, identify a logic structure in the design netlist, generate a driver based on the logic structure, apply a simulation and a formal model based on the driver, and test an output of the simulation and the formal model.

According to yet other embodiments, a non-transitory computer-readable storage medium is described. The non-transitory computer-readable storage medium may be configured to store instructions that, when executed by a computer, cause the computer to perform a method for assuring a reliability of a chip. The method may include retrieving a design netlist with a processor, identifying, via the processor, a logic structure in the design netlist, generating, via the processor, a driver based on the logic structure, applying, via the processor, a simulation and a formal model based on the driver, and testing, via the processor, an output of the simulation and the formal model.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 6 depicts an example of VHDL logic code in accordance with an exemplary embodiment;

FIG. 7 depicts an example of VHDL logic code, in accordance with an exemplary embodiments;

FIG. 8 depicts an example of VHDL logic code in accordance with some exemplary embodiments; and FIG. 9 depicts an example of VHDL code, in accordance with some exemplary embodiments.

DETAILED DESCRIPTION

Figure 1:
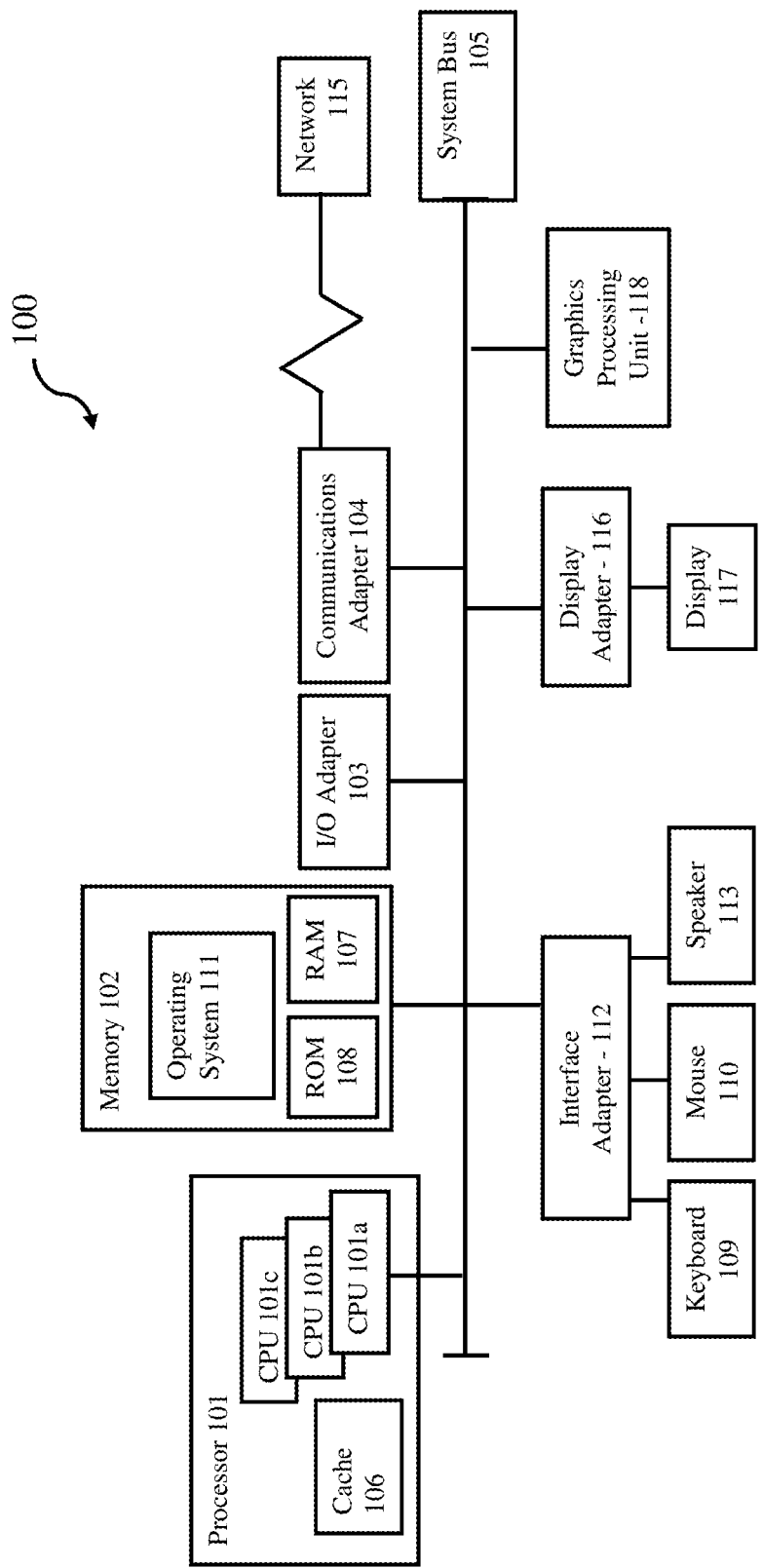
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices. Communications adaptor 104 may be operatively connect computer 100 to one or more networks 115. System bus 105 may also connect one or more user interfaces via interface adaptor 112. Interface adaptor 112 may connect a plurality of user interfaces to computer 100 including, for example, keyboard 109, mouse 110, speaker 113, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), or generally any device for executing computer-readable instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 111. Operating system 111 can control the execution of other computer programs and provides scheduling, input-output control, file and data management, memory management, and communication control and related services.

Input/output adaptor 103 can be, for example, one or more buses or other wired or wireless connections as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 110. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 115.

Network 115 can be an IP-based network for communication between computer 100 and any external device. Network 115 transmits and receives data between computer 100 and devices and/or systems external to computer 100. In an exemplary embodiment, network 115 can be a managed IP network administered by a service provider. Network 115 may be a network internal to an aircraft, such as, for example, an avionics network, etc. Network 115 may be implemented in a wireless fashion, e.g., using wireless protocols and technologies, such as WiFi, WiMax, etc. Network 115 may also be a wired network, e.g., an Ethernet network, an ARINC 429 network, a CAN, etc., having any wired connectivity including, e.g., an RS232 connection, R5422 connection, etc. Network 115 can also be a packet-switched network such as a local area network, wide area network, metropolitan area network, Internet network, or other similar type of network environment. The network 115 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

In electronic design, a netlist is a description of the connectivity of an electronic circuit. In some instances, a single netlist may effectively be a collection of several related lists. In their simplest form, a netlist may consist of a list of the terminals (pens) of electronic components in the circuit, and a list of the electrical conductors that interconnect the terminals.

Figure 2:
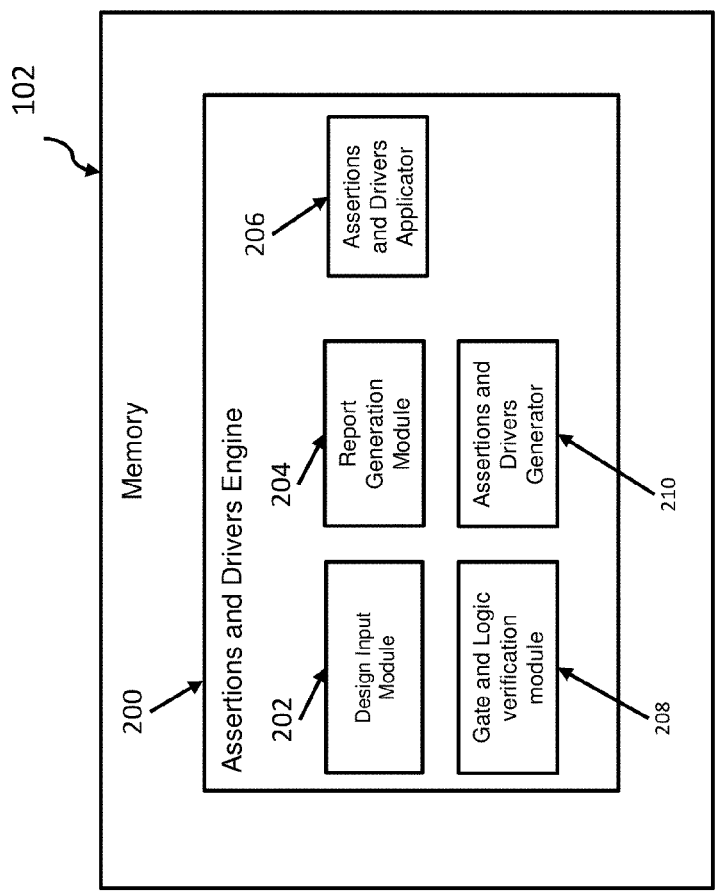
FIG. 2 depicts an exemplary computer memory having an assertions and drivers engine in accordance with an exemplary embodiment.

Referring now to FIG. 2, computer memory 102 is depicted having an assertions and drivers engine 200 (hereafter "engine 200"), in accordance with an exemplary embodiment. Assertions and drivers engine 200 may include a design input module 202, a report generation module 204, an assertions and drivers applicator 206, a gate and logic verification module 208, and in assertions and drivers generator 210.

Assertions and drivers engine 200 may be configured with a plurality of design modules and/or engines for performing portions of methods described herein. For example, design input module 202 may be configured to prompt for user input and retrieve user input. In some aspects design module 202 may be configured to retrieve a netlist from one or more local and or remotely located storage media. Report generation module 204 can be configured to generate one or more human readable reports configured to relay information in connection with a simulation result, a chip testing result, and/or other operations described herein. Report generation module 204 can be configured to output test information including statistical analysis of a design netlist, checking information, gating information from the design netlist, etc. Assertions and drivers applicator 206 may be configured to verify parity generation, traverse one or more net lists, perform one or more tests of an output of a simulation, and/or perform other aspects of embodiments described herein. Gate and logic verification module 208 may be configured to verify the validity of a parity operation. Assertions and drivers generator 210 may be configured to verify that the gating is correct, and generate drivers. Report generation module 204 may be configured to one or more design next lists retrieve a design netlist, for example.

Figure 3:
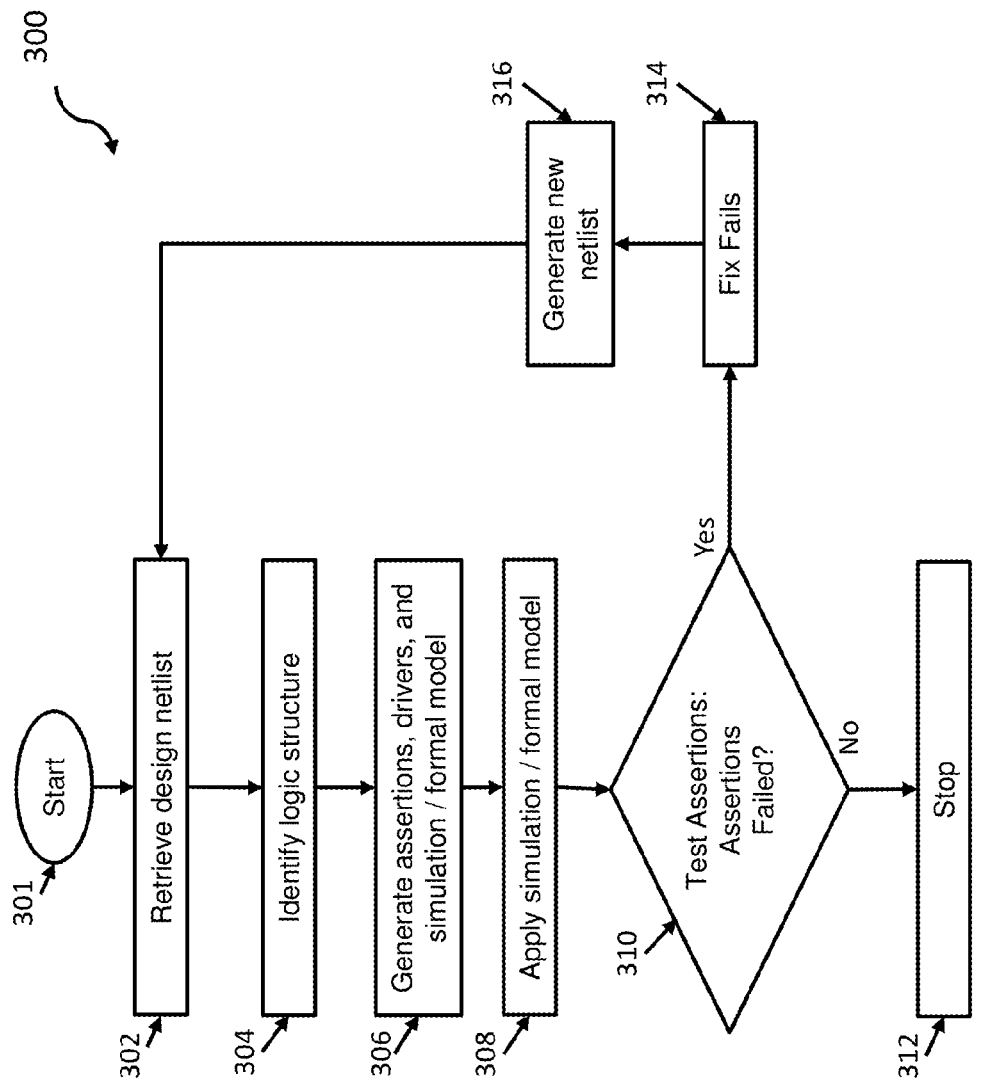
FIG. 3 depicts a flow diagram of a computer-implemented method for assuring chip reliability in accordance with an exemplary embodiment.

Referring now to FIG. 3, a flow diagram of a computer-implemented method 300 for assuring chip reliability is depicted, in accordance with an exemplary embodiment. After an initial start step, as shown in block 301, engine 200 may retrieve a circuit design netlist, as shown in block 302. In some aspects, engine 200 may obtain the circuit design in a source code form, such as VHDL code, or in a binary form, such as in a netlist. In some exemplary embodiments, the circuit design may be obtained in a human-readable or a non-human readable format.

As shown in block 304, engine 200 may identify a logic structure from the netlist. At block 306, engine 200 may generate the assertions, the drivers, a simulation, and a formal model. As shown at block 308, assertions and drivers applicator 206 may apply the simulation and formal model. In some aspects, engine 200 may test the assertions to determine whether the assertion conditions are met, as shown at block 310. If the assertions failed, as shown in block 314, engine 200 may notate, flag, and/or otherwise identify failing conditions, (whereby a designer may be alerted to fix the failing conditions) and generate a new netlist, as shown at block 316. If the assertions did not fail, the process may stop, as shown at block 312.

Figure 4:
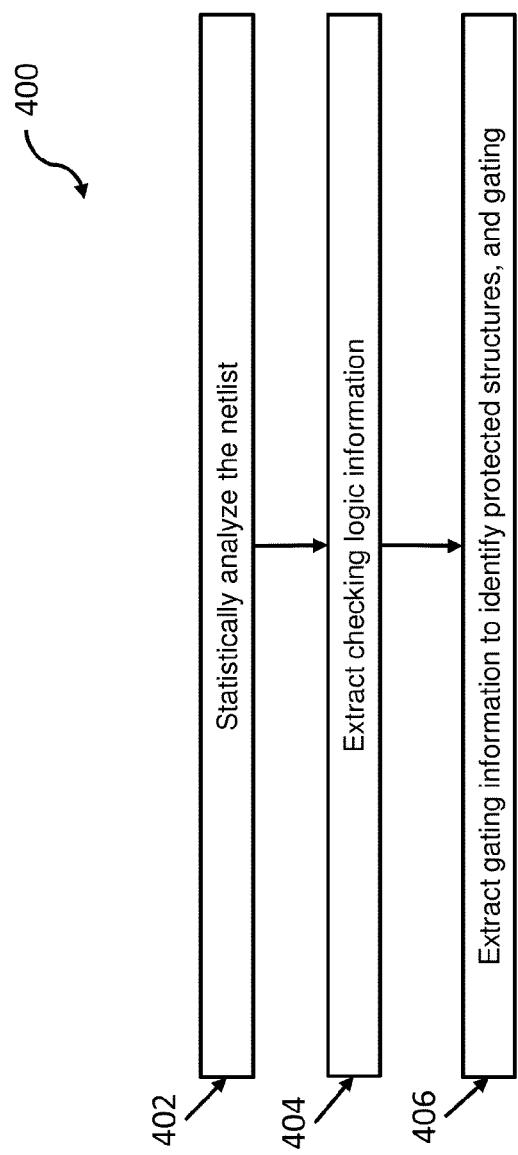
FIG. 4 depicts a flow diagram of a computer-implemented method for identifying logic structure in accordance with an exemplary embodiment.

Now considering the flow in greater detail, FIG. 4 depicts a computer-implemented method for identifying the logic structure (block 304), according to some exemplary embodiments. Referring now to FIG. 4, as shown in block 402, engine 200 may statistically analyze a netlist. According to some embodiments, based on the protection logic of the netlist, engine 200 may take a few sequential elements (for example, 8 bits) and perform a parity calculation to ensure that no elements (bits) have slipped. The dropped bits are referred to as a bit slip. Bit slippage may also be caused randomly by any number of electromagnetic disturbances, hardware malfunction, and/or other causes.

In some exemplary embodiments, as shown in block 402, gate and logic verification module 208 may perform a topological analysis of the circuit design with respect to the parity support signals to determine whether a bit slip has occurred. Additionally or alternatively, gate and logic verification module 208 may look for common parity protection structures in the circuit design netlist.

As shown at block 404, gate and logic verification module 208 may extract checking logic information from the design netlist. When there is a parity calculation connected to the checker, as shown at block 406, engine 200 may traverse the netlist and identify a structure of latches that may be protected by the parity check. If the parity generation is also in the netlist, then the identification may be based on both the parity check and the parity generation. According to other embodiments, other possible protection mechanisms are contemplated.

In some situations, the chip may be very large and may be divided into subunits. Accordingly, the party generation and parity check may be performed in different subunits. In such cases, the calculations for the most part may be performed on a single subunit. Accordingly, there may be cases where the parity generation corresponding to the parity check may be in another subunit and not in a given netlist. In these cases it may be more difficult to identify the protective structure and to specifically exclude any feeding conditions.

Referring again to FIG. 3, as shown in block 306, assertions and drivers generator 210 may generate assertions, drivers, and a simulation/formal model. According to some embodiments, an assertion is a code verification that may be used to detect erroneous conditions in the software and/or hardware performance. Assertions are generally used for chip design checking. For example, in some aspects assertions may catch programming errors. Assertions may express information about the functional behavior and/or nature of a block as the chip designer intended for it to be used. In other aspects, assertions may also be used as internal test points that wait for particular predefined conditions to occur. For example, assertions may be configured to notify a designer about the conditions causing an occurrence of an error. Assertions may also provide a plurality of design checkpoints that continuously evaluate chip performance in the form of an expression. When an expression does not hold true, an assertion flag may be raised by assertions and drivers applicator 206. More particularly, the driver for validating may validate gating conditions via the output of the latches of the parity check in cycles where the check has been gated. A verification engineer may go directly to the problem identified in the assertion instead of tediously backtracking waveforms or analyzing a megabit large log file. In some aspects assertions may be included directly within hardware descriptive language (HDL) code that compares the RTL description of the design. They may also be applied from the outside in the form of a test bench or collection of test vectors to check the designs response to input.

Figure 5:
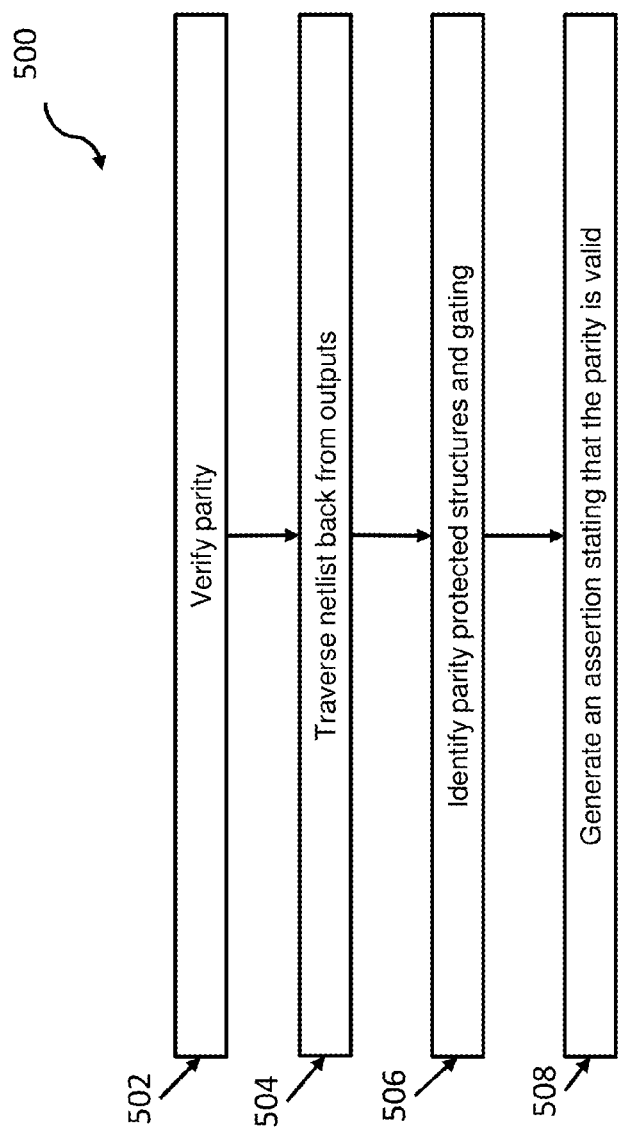
FIG. 5 depicts a flow diagram of a computer-implemented method for generating assertions, drivers, simulations, and formal models in accordance with an exemplary embodiment.

FIG. 5 depicts a flow diagram of a computer-implemented method for generating assertions, drivers, simulations and formal models, in accordance with an exemplary embodiment. As previously discussed, when the chip is very large it may be divided into subunits. Sometimes a parity generation driver and parity check driver may reside in different subunits. Accordingly, as shown in block 502, gate and logic verification module 208 may verify the parity signal at the unit level (and not in the chip level).

In some aspects, it may be necessary to verify that the parity signal generated and sent to a neighboring unit is valid, and that engine 200 performs the appropriate check. To that end, as shown in block 504, engine 200 may verify that there is a match between the generated parity and the checked parity in the sending unit. Accordingly, engine 200 may determine whether there is a match between the generated parity and the checked parity. Accordingly, engine 200 may traverse the netlist back from the outputs to identify the parity and the protected structures, and as shown in block 506, identify the gating in the two different sub-units away from the parity to the outputs.

As shown in block 508, assertions and drivers generator 210 may generate an assertion stating that the parity is valid. FIG. 6 depicts VHDL code, in accordance with some embodiments.

Referring briefly to FIG. 6, a vhdl code 600 is depicted. Engine 200 may reveal that the output signal (data_to_neigbour) should be the parity of the output bus (data_to_neigbour(0 to 4)) after traversing the netlists back from the outputs while applying the parity identification and protected structures identification. In this example, if there are no gates detected while traversing, and the assertions hold at every cycle, engine 200 may extract the small relevant part of the model and use the part for a formal to prove that the above assertion holds true. Accordingly, engine 200 may verify, with assertions and drivers applicator 206, that the corresponding inputs are checked and verified as correct, or verified as not correct. Accordingly, engine 200 may determine a correctness status of the corresponding inputs.

By way of another example, referring briefly to FIG. 7, example of an original VHDL code 700 is depicted according to some embodiments. Engine 200 may traverse the netlist to reveal that data_p should be the parity of data. However, the invariant may not hold true if sel_q(0) and sel_q(1) are not mutually exclusive. The two signals shown here could be mutually exclusive since, for example, one of the signals is the negation of the other. But they may also be mutually exclusive only in the wider context of the sub-unit under legal input vectors. Accordingly, engine 200 may determine a correctness status of the two different sub-units by extracting a small part of the model to prove the generated invariant with a formal. If the formal fails to prove the invariant, engine 200 may use a simulation, and then verify that the receiving unit has used the appropriate checking algorithm.

Referring once again to FIG. 5, after identifying the parity protected structures and gating as shown at block 506, engine 200 may generate an assertion stating that the parity is valid (as shown at block 508). Engine 200 may either use the assertion with respect to the simulation, or use the assertion with respect to a formal on the extractive model.

After generating assertions, assertions and drivers engine 200 may automatically generate drivers for a simulation. In some aspects, engine 200 may automatically create a driver to verify that the gating on the way to the checker is correct. Particularly, engine 200 may generate a driver to verify that the netlist is not over gating or otherwise gating improperly. If the netlist is over gating, than an unreported error may propagate and cause silent data corruption. If the netlist is not gating properly, then a redundant recovery process (which may be expensive in resources) may occur. FIG. 8 depicts an example of an original VHDL code 800, in accordance with some exemplary embodiments.

Referring now to FIG. 8, in the first stage of applying the automatic detection of parity calculation and gating engine 200 may determine that the expression not(m3_valid) indicate gates to the parity check, and that the signals vec_p_q, vec_q are the arguments of the parity check. Engine 200 may next synthesize a driver in which copies of the two latches are generated, with the difference being that the output signal is renamed. Accordingly, engine 200 may override the original output of each latch such that it may be randomized when the check is gated and has assumed the original value. FIG. 9 depicts the new, overridden version of the second latch.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for assuring a reliability of a chip comprising:
    retrieving a design netlist with a processor;
    identifying, via the processor, a logic structure in the design netlist;
    generating, via the processor, a driver based on the logic structure, wherein generating the driver based on the logic structure comprises:
        verifying a parity;
        traversing a netlist back from a plurality of netlist outputs;
        identifying one or more parity protected structures and one or more gates, wherein protected parity structures comprises a duplication protection; and
        generating an assertion indicative of a parity validity;
    applying, via the processor, a simulation and a formal model based on the driver; and
    testing, via the processor, an output of the simulation and the formal model.

2. The computer-implemented method of claim 1 wherein identifying the logic structure in the design netlist comprises:
    statistically analyzing the design netlist;
    extracting checking logic information from the design netlist; and
    extracting gating information from the design netlist.

3. The computer-implemented method of claim 2 wherein extracting the gating information comprises identifying a plurality of protected structures and a plurality of gating structures.

4. The computer-implemented method of claim 1 wherein
    traversing a netlist back from a plurality of netlist outputs;
    identifying one or more parity protected structures and one or more gates, wherein protected parity structures comprise a onehot protection.

5. The computer-implemented method of claim 1 wherein generating the simulation and the formal model based on the driver further comprises:
    generating a model for formal.

6. The computer-implemented method of claim 5, further comprising generating an assertion for formal.

7. The computer-implemented method of claim 6, wherein either the model for formal and the assertion for simulation indicates a correctness status between two different sub-units of the chip.

8. A system for assuring a reliability of a chip comprising:
    a processor configured to:
    retrieve a design netlist;
    identify a logic structure in the design netlist;
    generate a driver based on the logic structure by:
        verifying a parity;
        traversing a netlist back from a plurality of netlist outputs;
        identifying one or more parity protected structures and one or more gates, wherein protected parity structures comprises a duplication protection; and
        generating an assertion indicative of a parity validity;
    apply a simulation and a formal model based on the driver; and
    test an output of the simulation and the formal model.

9. The system of claim 8 wherein the processor is further configured to:

statistically analyze the design netlist;

extract checking logic information from the design netlist; and extract gating information from the design netlist; and identify the logic structure in the design netlist based on a statistical analysis of the design netlist, the logic information, and the gating information.

10. The system of claim 9 wherein the processor is further configured to extract gating information by identifying a plurality of protected structures and a plurality of gating structures.

11. The system of claim 8, wherein protected parity structures comprise a onehot protection.

12. The system of claim 8 wherein the processor is further configured to:

generate a model for formal.

13. The system of claim 12, further comprising generating an assertion for formal.

14. The system of claim 13, wherein either the model for formal and the assertion for simulation indicates a correctness status between two different sub-units of the chip.

15. A non-transitory computer-readable storage medium storing instructions that, when executed by a computer, cause the computer to perform a method for assuring a reliability of a chip, the method comprising:

retrieving a design netlist of the chip with a processor;

identifying, via the processor, a logic structure in the design netlist;

generating, via the processor, a driver based on the logic structure wherein generating the driver based on the logic structure comprises:

verifying a parity;

traversing a netlist back from a plurality of netlist outputs;

identifying one or more parity protected structures and one or more gates, wherein protected parity structures comprises a duplication protection; and generating an assertion indicative of a parity validity;

applying, via the processor, a simulation and a formal model based on the driver; and testing, via the processor, an output of the simulation and the formal model.

16. The non-transitory computer-readable storage medium of claim 15, wherein identifying the logic structure in the design netlist comprises:

statistically analyzing the design netlist;

extracting checking logic information from the design netlist; and extracting gating information from the design netlist.

17. The non-transitory computer-readable storage medium of claim 16 wherein extracting the gating information comprises identifying a plurality of protected structures and a plurality of gating structures.

18. The non-transitory computer-readable storage medium of claim 15, wherein protected parity structures comprise onehot protection.

19. The non-transitory computer-readable storage medium of claim 15, wherein generating the simulation and the formal model based on the driver further comprises:

generating one of a model for formal and an assertion for simulation, wherein either the model for formal and the an assertion for simulation indicates a correctness status between two different sub-units of the chip.

20. The non-transitory computer-readable storage medium of claim 19, further comprising generating an assertion for formal.

* * * * *